(12) United States Patent
Taveniku

(10) Patent No.: US 11,879,705 B2
(45) Date of Patent: Jan. 23, 2024

(54) SYSTEM AND METHOD FOR ACTIVE SHOOTER DEFENSE

(71) Applicant: Mikael Bror Taveniku, Pelham, NH (US)

(72) Inventor: Mikael Bror Taveniku, Pelham, NH (US)

( * ) Notice: Subject to any disclaimer, the term of this patent is extended or adjusted under 35 U.S.C. 154(b) by 792 days.

(21) Appl. No.: 16/559,703

(22) Filed: Sep. 4, 2019

(65) Prior Publication Data

US 2021/0063120 A1 Mar. 4, 2021

Related U.S. Application Data

(60) Provisional application No. 62/694,169, filed on Jul. 5, 2018.

(51) Int. Cl.
| | |
|---|---|
| *F41H 11/00* | (2006.01) |
| *B64C 39/02* | (2023.01) |
| *G06V 20/52* | (2022.01) |
| *G06V 40/16* | (2022.01) |
| *G06V 10/764* | (2022.01) |
| *G06V 10/82* | (2022.01) |
| *G06V 40/20* | (2022.01) |
| *F41H 9/00* | (2006.01) |
| *F41H 13/00* | (2006.01) |
| *B64U 101/00* | (2023.01) |

(52) U.S. Cl.
CPC ............ *F41H 11/00* (2013.01); *B64C 39/024* (2013.01); *G06V 10/764* (2022.01); *G06V 10/82* (2022.01); *G06V 20/52* (2022.01); *G06V 40/172* (2022.01); *G06V 40/20* (2022.01); *B64U 2101/00* (2023.01); *F41H 9/00* (2013.01); *F41H 13/0012* (2013.01)

(58) Field of Classification Search
None
See application file for complete search history.

(56) References Cited

U.S. PATENT DOCUMENTS

| | | | | |
|---|---|---|---|---|
| 6,000,340 A | * | 12/1999 | Small | F41A 19/58 |
| | | | | 102/380 |
| 6,056,237 A | * | 5/2000 | Woodland | F42B 12/365 |
| | | | | 244/49 |
| 6,204,762 B1 | * | 3/2001 | Dering | G08B 13/19695 |
| | | | | 340/541 |
| 6,877,434 B1 | * | 4/2005 | McNulty, Jr. | F42B 12/36 |
| | | | | 102/502 |
| 8,205,537 B1 | * | 6/2012 | Dupont | F41H 13/0006 |
| | | | | 102/504 |

(Continued)

OTHER PUBLICATIONS https://cleorobotics.com/ Jan. 1, 2019.
www.eyedea.co.kr Jan. 1, 2016.
www.uAvionix.com Jan. 1, 2019.

*Primary Examiner* — Derrick R Morgan
(74) *Attorney, Agent, or Firm* — Dawson Law Firm, P.C.; Michael J. Nickerson

(57) ABSTRACT

A security system including: a detector that senses and detects a physical threat to persons in a protected area; and a defensive weapon in the protected area that deploys to disable a detected physical threat. The defensive weapon can be, for example, a guided ordnance, a guided weaponized UAV, or a combination thereof. Also disclosed are methods of making and using the security system.

10 Claims, 8 Drawing Sheets

(56) References Cited

U.S. PATENT DOCUMENTS

| | | | | |
|---|---|---|---|---|
| 8,342,098 | B2* | 1/2013 | Shalev | F42B 5/02 |
| | | | | 102/512 |
| 8,927,935 | B1* | 1/2015 | Meline | F41H 13/0062 |
| | | | | 250/340 |
| 9,589,448 | B1* | 3/2017 | Schneider | F41H 11/00 |
| 10,005,556 | B2* | 6/2018 | Rastgaar Aagaah | F41B 11/80 |
| 10,155,587 | B1* | 12/2018 | Tang | B64C 27/08 |
| 10,197,365 | B1* | 2/2019 | Blyskal | F41H 13/0006 |
| 10,288,398 | B1* | 5/2019 | Verini | F42B 5/145 |
| 10,315,528 | B1* | 6/2019 | Crawford, Jr. | B60L 53/80 |
| 10,458,757 | B1* | 10/2019 | Kearney-Fischer | F41H 11/02 |
| 10,980,218 | B2* | 4/2021 | Gorski | A61B 5/0022 |
| 11,282,353 | B1* | 3/2022 | Fowler | G08B 13/19613 |
| 11,312,493 | B2* | 4/2022 | Nord | B64U 50/19 |
| 11,410,420 | B1* | 8/2022 | Roy | H04W 4/80 |
| 2010/0128123 | A1* | 5/2010 | DiPoala | G08B 13/19619 |
| | | | | 340/541 |
| 2010/0128446 | A1* | 5/2010 | DiPoala | H05K 5/0256 |
| | | | | 361/729 |
| 2010/0198514 | A1* | 8/2010 | Miralles | G05D 1/12 |
| | | | | 701/302 |
| 2010/0279649 | A1 | 11/2010 | Thomas | |
| 2011/0072956 | A1* | 3/2011 | Wall | F41H 13/0087 |
| | | | | 102/305 |
| 2011/0279270 | A1* | 11/2011 | Marckwald | G08B 25/10 |
| | | | | 340/541 |
| 2013/0057693 | A1* | 3/2013 | Baranek | G06V 40/166 |
| | | | | 348/152 |
| 2014/0118554 | A1* | 5/2014 | Bucknor | G08B 15/005 |
| | | | | 348/155 |
| 2015/0179039 | A1* | 6/2015 | Miwa | G08B 25/006 |
| | | | | 340/573.1 |
| 2015/0316345 | A1* | 11/2015 | Brahler, II | F41B 11/60 |
| | | | | 124/73 |
| 2015/0321758 | A1* | 11/2015 | Sarna, II | B64C 39/024 |
| | | | | 244/63 |
| 2016/0247374 | A1* | 8/2016 | Crowe | G08B 15/02 |
| 2016/0266577 | A1* | 9/2016 | Kerzner | G05D 1/104 |
| 2016/0267759 | A1* | 9/2016 | Kerzner | G08B 13/19697 |
| 2016/0284182 | A1* | 9/2016 | Havens | G08B 13/19682 |
| 2017/0092109 | A1* | 3/2017 | Trundle | G08B 25/006 |
| 2017/0122713 | A1* | 5/2017 | Greenwood | F42C 17/04 |
| 2017/0193308 | A1* | 7/2017 | Buyse | B64C 39/024 |
| 2017/0286654 | A1* | 10/2017 | Nicoll | F41A 17/08 |
| 2017/0286762 | A1* | 10/2017 | Rivera | H04N 23/51 |
| 2017/0363391 | A1* | 12/2017 | Conklin | F41G 5/14 |
| 2018/0037321 | A1* | 2/2018 | Wilkinson | F41H 3/00 |
| 2018/0067502 | A1* | 3/2018 | Chi-Hsueh | B64D 47/08 |
| 2018/0136670 | A1 | 5/2018 | Gurdan | |
| 2018/0162527 | A1* | 6/2018 | Hupp | G05D 1/0094 |
| 2018/0162530 | A1* | 6/2018 | Klein | B64D 1/02 |
| 2018/0233009 | A1* | 8/2018 | Spector | G05D 1/0094 |
| 2018/0315200 | A1* | 11/2018 | Davydov | G10L 15/26 |
| 2018/0322749 | A1* | 11/2018 | Kempel | G08B 13/19608 |
| 2018/0330631 | A1* | 11/2018 | Preston, II | F42B 8/14 |
| 2018/0335779 | A1* | 11/2018 | Fisher | F41H 13/0006 |
| 2018/0341262 | A1* | 11/2018 | Yeshurun | G01S 7/38 |
| 2019/0204836 | A1* | 7/2019 | Rezvani | B64C 39/024 |
| 2019/0248507 | A1* | 8/2019 | Fox | G06V 20/17 |
| 2019/0347924 | A1* | 11/2019 | Trundle | H04B 7/18504 |
| 2020/0003529 | A1* | 1/2020 | Benezra | B64C 39/024 |
| 2020/0027326 | A1* | 1/2020 | Ravat | G08B 13/26 |
| 2020/0108924 | A1* | 4/2020 | Smith | B64D 1/02 |
| 2020/0108925 | A1* | 4/2020 | Smith | B64C 39/024 |
| 2020/0108926 | A1* | 4/2020 | Smith | B64C 39/024 |
| 2020/0130834 | A1* | 4/2020 | Nord | B64C 39/024 |
| 2020/0158822 | A1* | 5/2020 | Owens | H01Q 1/526 |
| 2020/0180784 | A1* | 6/2020 | Frucht | H04N 5/77 |
| 2020/0284566 | A1* | 9/2020 | Viviani | B64D 7/00 |
| 2020/0333780 | A1* | 10/2020 | Kerzner | G08B 15/00 |
| 2020/0354059 | A1* | 11/2020 | Newman | B64U 30/20 |
| 2020/0363165 | A1* | 11/2020 | Ang | F41H 11/02 |
| 2020/0409366 | A1* | 12/2020 | Schneider | B64D 1/16 |
| 2021/0063120 | A1* | 3/2021 | Taveniku | G06V 20/52 |
| 2021/0092604 | A1* | 3/2021 | Fox | B64C 39/024 |
| 2021/0112647 | A1* | 4/2021 | Coleman | H05B 45/12 |
| 2021/0188431 | A1* | 6/2021 | Araki | G05D 1/102 |
| 2021/0300549 | A1* | 9/2021 | Beloussov | B64C 39/024 |
| 2021/0347475 | A1* | 11/2021 | Klein | F41H 11/04 |
| 2022/0028234 | A1* | 1/2022 | Faizan | G06N 20/00 |
| 2022/0082357 | A1* | 3/2022 | Smith | F41H 13/0025 |

\* cited by examiner

SYSTEM AND METHOD FOR ACTIVE SHOOTER DEFENSE

PRIORITY INFORMATION

The present application claims priority, under 35 U.S.C. § 119(e), from U.S. Provisional Patent Application, Ser. No. 62/694,169, filed on Jul. 5, 2018. The entire content of U.S. Provisional Patent Application, Ser. No. 62/694,169, filed on Jul. 5, 2018, is hereby incorporated by reference.

BACKGROUND

Conventional weaponized unmanned aerial vehicles "UAVs," such as a drone and Taser combination, require a remote human operator.

Published US Patent Application Number 2017/0286654 describes an example of a weaponized UAV. The entire content of Published US Patent Application Number 2017/0286654 is hereby incorporated by reference.

Published US Patent Application Number 2017/0286654 describes a system and method for smart weapon implementation and deployment which utilizes a weapon equipped with processing capabilities and can include, inter alia, communication technology, geographic positioning systems, a camera, memory, and the ability to enable or disable the weapon remotely. Through the application of various protocols (e.g., access, monitor, control, programming), a weapon can be designated for one or more authorized users, and will not operate when not being used by an authorized user. Other implementations include smart ammunition that can also be programmed for a specific user, or more preferably for a specific weapon, such that the weapon and/or the ammunition would not work without the other, and only by the registered authorized user of the same.

Published US Patent Application Number 2010/0279649 describes another example of a weaponized UAV. The entire content of Published US Patent Application Number 2010/0279649 is hereby incorporated by reference.

Published US Patent Application Number 2010/0279649 describes a personal security and law enforcement evidence documenting and criminal apprehension coordinated improved system, which includes an unmanned aerial vehicle, having a wireless transceiver, an airframe, a propulsion system, a navigation mechanism, a processor, a memory, a power source, and at least one fuel tank. The system also features a control system having a wireless transceiver, an input device, capable of receiving a user's input and converting the user's input to electrical signals, a processor, and a memory. The control system is in wireless communication with the vehicle such that the control system is capable of utilizing the propulsion system in substantially real-time.

Published US Patent Application Number 2018/0136670 describes aerial display visualization. The entire content of Published US Patent Application Number 2018/0136670 is hereby incorporated by reference.

Published US Patent Application Number 2018/0136670 describes systems and methods that may include: receiving, at a computing device comprising a processor, location data and drone data; distributing, by the computing device, a plurality of drones based on the aspects of an aerial image such that, during flight, the plurality of drones form the aerial image; and exporting, by the computing device, coordinates for each of the plurality of drones. The location data may define aspects of the aerial image to be formed by the plurality of drones. The drone data may include a number of drones within the plurality of drones. The coordinate for each of the plurality of drones may define a location for a respective drone within the aerial image.

Published US Patent Application Number 2018/0067502 describes a drone security system. The entire content of Published US Patent Application Number 2018/0067502 is hereby incorporated by reference.

Published US Patent Application Number 2018/0136670 describes a system that includes a plurality of positioning units, a mainframe, at least one drone base, and a mobile device. Each positioning unit consists of a positioning sensing module and a signal transmitting module. The mainframe is wirelessly connected to the positioning units and is formed by a processor, a signal receiving module, a central data center, and an information display module. The drone base is in electrical connection with the mainframe and each drone base includes at least one drone that is disposed with a deterrent device. The mobile device is in electrical connection with the mainframe and the at least one drone base. Safety guards can be replaced by drones that reach intrusion area quickly and synchronously so that security of the area is ensured.

Published US Patent Application Number 2013/0057693 describes an intruder imaging and identification system. The entire content of Published US Patent Application Number 2013/0057693 is hereby incorporated by reference.

Published US Patent Application Number 2013/0057693 describes an intruder identification system for capturing a digital image in a field of view generally comprising an image capturing device and one or a plurality of sound emitters for attracting a gaze of an intruder and a turning of their face to an image capturing position in the field of view. A preferred image capturing position being when both eyes of the intruder are viewable in the field of view of the image capturing device, detectable by the employment of facial recognition software adapted at the task and thereafter digitally storing the image. The identity of the intruder may be determined using software adapted to identify individuals from the captured facial image. The system may also employ means for electronic communication for transmitting the digital image to a video display operatively connected with a user's receiving device, such as a smart phone.

Conventional computer vision recognition tools are available that can target and follow a live subject. Additionally, smart vision software is available having an architecture that can detect objects, track objects, simultaneously localize and map, avoid obstacles, stabilize images, and be trained for various tasks (see for example the PITTA autonomous flying selfie drone based on a visual tracking system; the eyedeaDrone.actionCam; Smart Vision S/W Architecture; and Target Applications; at eyedea.co.kr).

A conventional compact (e.g., palm sized) UAV or drone having a co-axial, counter-rotating, dual propeller and vent/duct configuration, and advanced camera sensing and image analysis is available from Cleorobotics™ (see cleorobotics.com).

ADS-B out and ADS-B in gear (i.e., transponder and transceiver) for operating an ADS-B equipped UAV in the US National Airspace System is commercially available from uAvionix Corp. (see uAvionix.com).

Advances in the area of image processing and components, e.g., very low cost cameras, UAV technology, batteries, compute performance, machine learning, artificial intelligence, indoor navigation, IOT, small electrical motors, new high density energy storage materials, and like technologies, can all further enable autonomous surveillance and UAV operations.

There also exist defense related technologies for target identification and tracking, behavioral analysis, and advanced air vehicle control software. Many of these technologies derived from fundamental research programs are already in the public domain. In the defense domain, weaponized UAVs are typically based on, e.g., large platforms, long operating range, and lethal weapons. These approaches are applicable to the defense domain, but can be modified, for example, to use very small platforms and non-lethal disabling technologies.

Notwithstanding the various conventional systems described above, it is desirable to provide a system and/or a method for secure area surveillance and neutralizing an intruder or threat with a semi-autonomous or autonomous unmanned aerial vehicle (UAV).

It is further desirable to provide a system and/or a method for secure area surveillance and neutralizing a detected physical threat, such as a person, a weapon, or both, with a system guided weapon and without an unmanned aerial vehicle (UAV).

BRIEF DESCRIPTION OF THE DRAWINGS

The drawings are only for purposes of illustrating various embodiments and are not to be construed as limiting, wherein.

DETAILED DESCRIPTION

Figure 1:
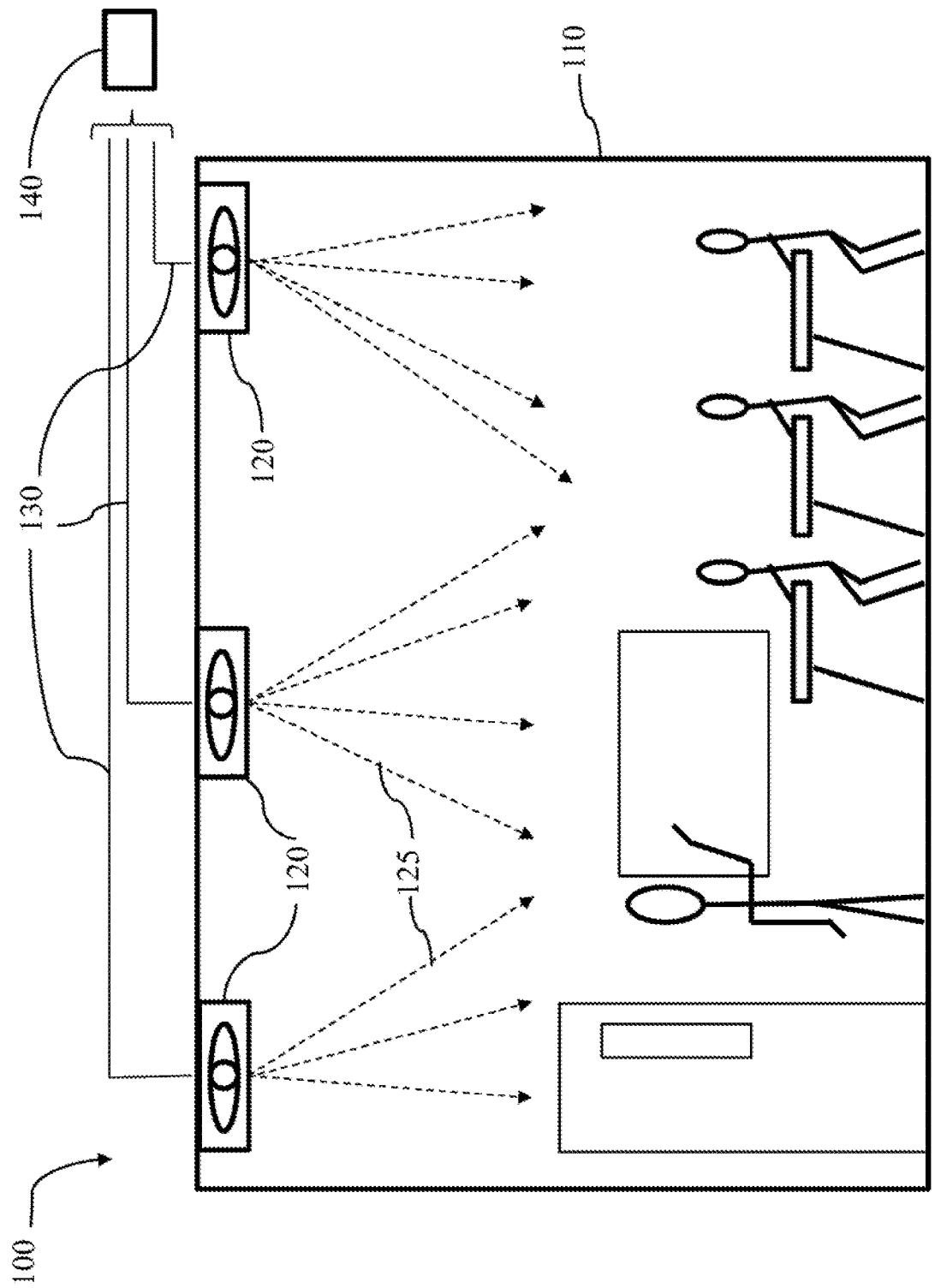
FIG. 1 shows a schematic of a surveillance and UAV attack system.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

"Base" refers to a part of the system that contains a computational unit for sensor processing, and depending on system configuration or variation, can be used synonymously for a docking station, which is the entity that in hardware and in software manages a UAV when the UAV is inactive, not operating, or is independent of the base. A base can have a network connection to a backend system. The base can have a wire or wireless power source.

"Docking station" refers to a physical part of the base that contains the mechanical parts for holding one or more UAV. The docking station provides a resting and charging place for a UAV. The docking station can also provide electrical power, optionally compute power, and hold non-flying parts of the UAV. The non-flying parts of the UAV, although physically located in the base, can still be considered parts or components of the UAV for simplification. The docking station can optionally have, for example, an active launch system to accelerate the UAV into flight.

"Backend system," "backend," and like terms refer to the computer(s) and software that control and aggregate a set of bases in a facility. The backend is the entity that has facility wide view of situations within a protected facility. A backend subsystem in the system can refer to the hardware and processing power to operate an identification subsystem.

"Unmanned aerial vehicle" ("UAV"), "Unmanned aerial system" ("UAS"), "drone," and like terms refer to an unmanned aerial vehicle or entity that flies from a base to a target. The entity can be, for example, complex, i.e., autonomous or semi-autonomous, such as a UAV with one or more weapons. The entity can be, for example, minimal or simple such as a motorized dart with on-board sensors with little independence or autonomy, and that can be controlled by a base by a communications link.

"Weapon", "ordnance", "payload", and like terms in the context of the defensive security system refer to a physical entity on-board a UAV, or off-board a UAV when there is no UAV in the defensive security system, and the weapons is directed against an adversarial target. A weapon in the defensive security system can be, for example, a Taser, a chemical agent, e.g., Chemical Mace or formula variants thereof (e.g., triple action formula, pepper spray), a druggable dart, and like incapacitating projectiles or agents, or combinations thereof. Additionally or alternatively, the defensive weapon can be, for example, a blunt force object consisting of the UAV itself, which can be delivered to a target, with or without additional weaponry.

"Electroshock weapon," "Taser," and like terms refer to an example of a non-lethal weapon, and synonymous with a stun-gun, or stun device. Conventional Tasers include a charging device with electronics, for high-voltage, that then shoots a dart or a prong (i.e., electrodes) with tethered wires to shock a target. A stun gun can have prongs connected to a power source, and requires the stun gun prongs to connect to the target. A UAV or a drone can shoot a dart or prongs to the target making a flying Taser or a flying stun gun. The weaponized UAV or drone can be an active part of a Taser, i.e., the vehicle is the electrode for delivering the charge to the target. A UAV or drone having one or more electrodes, but without tethering, can deliver the charge to the threat by flying to and contacting (e.g., striking) the threat.

"Target" refers to an live human or humanoid (e.g., an assault robot controlled by a human) entity that is presenting a physical threat to the people or population in the area to be protected, for example, a person with a drawn weapon, where a shooting is imminent, or poses an active threat. If shots have been fired in the protected area, the sensors of the system can detect the location of shot discharge and activate steps to neutralize the target.

"Weapon," "adversarial weapon," in the context of an adversary or threat, standing alone or in the possession of the adversarial target refers to a physical entity that presents a physical threat. The system can be trained to identify most known weapon types, e.g., based on manufacturer specifications, or typical shape form factor, whether in the possession of the adversarial target or in the possession of authorized persons.

"Improvised weapon" standing alone or in the possession of an adversarial target refers to, for example, a gun or firearm, a grenade launching sling shot, or similar device that is not an industry known item or manufactured item, and is previously unknown to the weapon database in the system.

"CSWAP" is an acronym for cost, size, weight, and power.

"Massive Scale" refers to the scale of connectivity of the computing architecture underlying the present invention. This can mean an arbitrarily large array of networked computers working to solve a common problem.

"Physical threat" means that a person intends to do bodily harm to an individual or a group of individuals either using a firearm, edge weapon, blunt force weapon, or any other means of inflicting harm, with the intent to wound or kill.

By combining large scale machine learning, advances in image processing technology, with small UAV platforms having non-lethal weapons, a security system and security method can be provided that disables a shooter within seconds, and anywhere in a facility under surveillance. The security system and security method can also disable the shooter without anyone being lethally harmed.

Referring to the Figures, FIG. 1 shows a schematic of a surveillance and attack system 100 including, for example: a surveillance domain 110 such as a classroom with a teacher and students; a plurality of host base stations 120, each station hosting a UAV that has stationary and mobile sensing 125 capability; and a wired or wireless two-way connection 130 between each base station 120 and a server 140 (i.e., backend). The surveillance domain 110 has a bounded or defined space and can be, for example, indoor or outdoor, such as a classroom, an office, an auditorium, a sport arena, and like spaces. The host base station 120 can be, for example, ceiling mounted, wall mounted, pole mounted, and like mount configurations, or combinations thereof.

Figure 2:
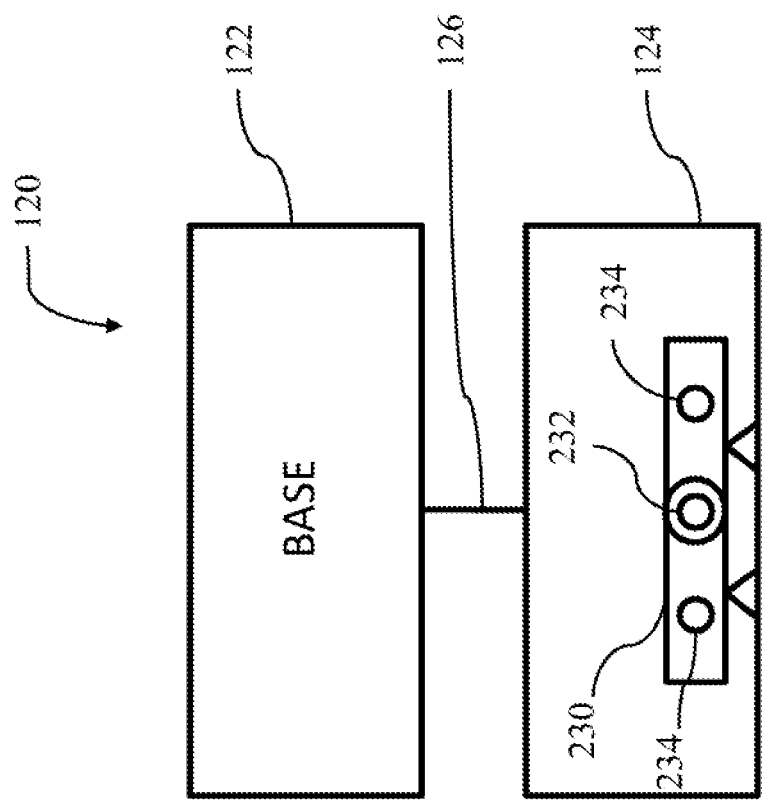
FIG. 2 shows an example of a host base station with each station hosting a UAV.

FIG. 2 shows an example of a host base station 120, with each host base station having a base 122 and a UAV port 124 having, for example, an optional UAV housing and a UAV 230. The base station 120 has a wired or a wireless communication connection 126 between the base 122 and the UAV port 124. The UAV 230 includes one or more sensors 232, for example, a camera, a motion detector, a thermal sensor, an infrared sensor, and like sensors, or a combination thereof. The UAV 230 includes one or more UAV ordnance 234, for example, an explosive, a stun grenade, a Taser, a tranquilizing dart, a chemical spray, such as mace or pepper spray, live ammunition, such as bullets or rubber bullets, etc. Each base station 120 has a wired or wireless two-way connection between its hosted UAV 230 and a server (not shown) such as a facility controller, a cloud connection, or both.

The UAV can have, for example, an ADS-B transceiver that allows the UAV to transmit in real-time its identification, type, position, velocity, and course information, for example, to other UAVs in the system, to a base station, to a cloud computer, and like system resources, or a combination thereof.

The UAV can have, for example, an ADS-B receiver for receipt of, for example, target information, i.e., target intelligence, from other UAVs in the system, from a base station, from a UAV flight controller, from a cloud computer, and like system resources, or combinations thereof, for automated collision avoidance with other UAVs, for UAV target attack instructions, and like operations.

The UAV can be the ordnance (i.e., without any other onboard ordnance) that functions, for example, as a blunt ballistic munition having sufficient weight and velocity to strike and disable or neutralize a target.

Figure 3:
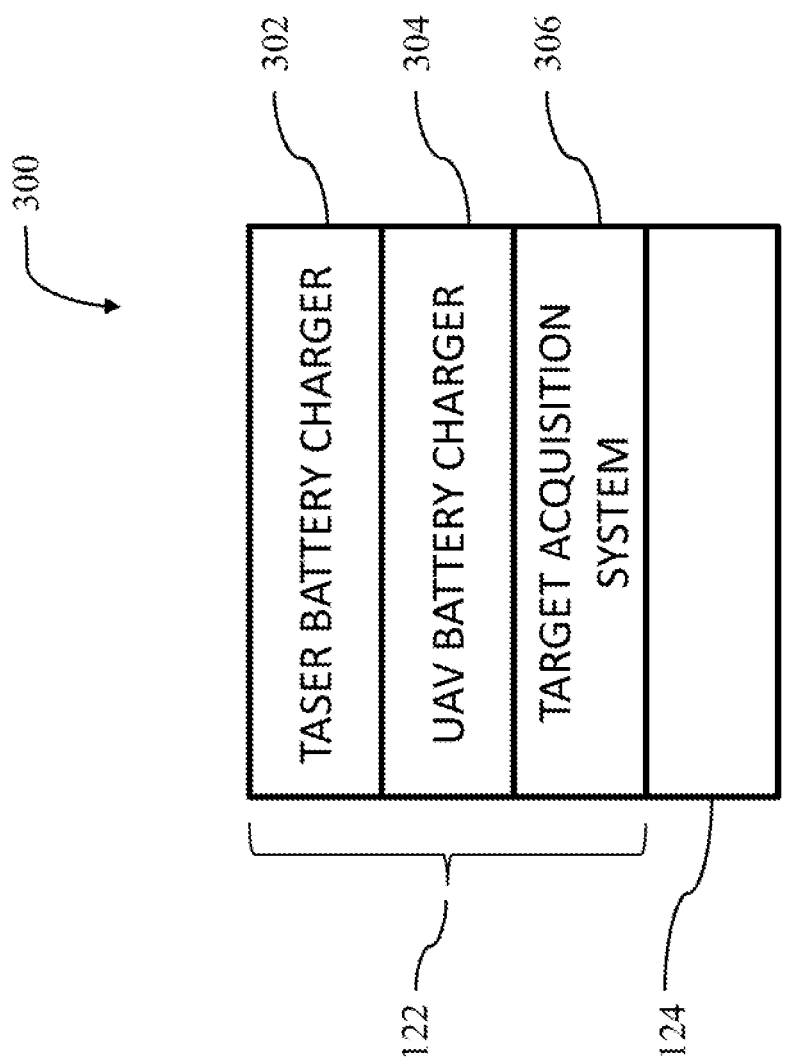
FIG. 3 is a block diagram that shows an exemplary host base station having a base, and a UAV port having a hosted UAV and having a Taser ordnance.

FIG. 3 is a block diagram that shows an exemplary host base station 300 having a base 122, and a UAV port 124 having a hosted UAV (not shown) weaponized with, e.g., a Taser ordnance. A Taser enabled base 122 includes, for example, a Taser battery charger 302 such as an ultracapacitor or supercapacitor, a UAV battery charger 304, and a target acquisition computer 306. The enumerated components of the host base station 300 are in electrical communication with a reliable power source (not shown).

The target acquisition computer ("TAC") can provide computation, for example, for target acquisition, target tracking, payload delivery, or a combination thereof. In a first TAC software process step, a threat is detected and confirmed. The processing can be accomplished, for example, by one or more computers in the system, or a combination thereof. In a second TAC software process step, a target can be acquired, a target can be tracked, and the second process step can provide instructions for a UAV to deliver a payload to the target.

The TAC and TAC processing can be distributed across one or more computers in the system, for example, one or more UAV computer, one or more base computer, a facility computer, a cloud computer, or a combination thereof. The distribution of the TAC and TAC processing can be determined by desired operation and cost considerations.

For example, as commercially available computational power continues to increase and computer size continues to decrease, the TAC hardware and TAC processing can be transferred from a stationary location such as a facility computer or a base computer, to reside on a UAV mobile computer.

The TAC can receive detected threat information, for example, additional information about the target, or analysis information, such as from the facility system computer and controller, and delivered to the UAV as it flies to a target. The TAC can process sensor information from all available resources such as the UAV, or other system sensor resources such as stationary cameras, or combinations thereof, for example, to further direct the UAV to the target, track the target's movement, further direct the UAV to most vulnerable areas of the target (e.g., a flank or rear attack), determine the target's size and hardness for appropriate payload delivery force, or combinations thereof. The TAC can use conventional methods, machine learning methods, or both, to compute target attack strategies and approaches.

Figure 4:
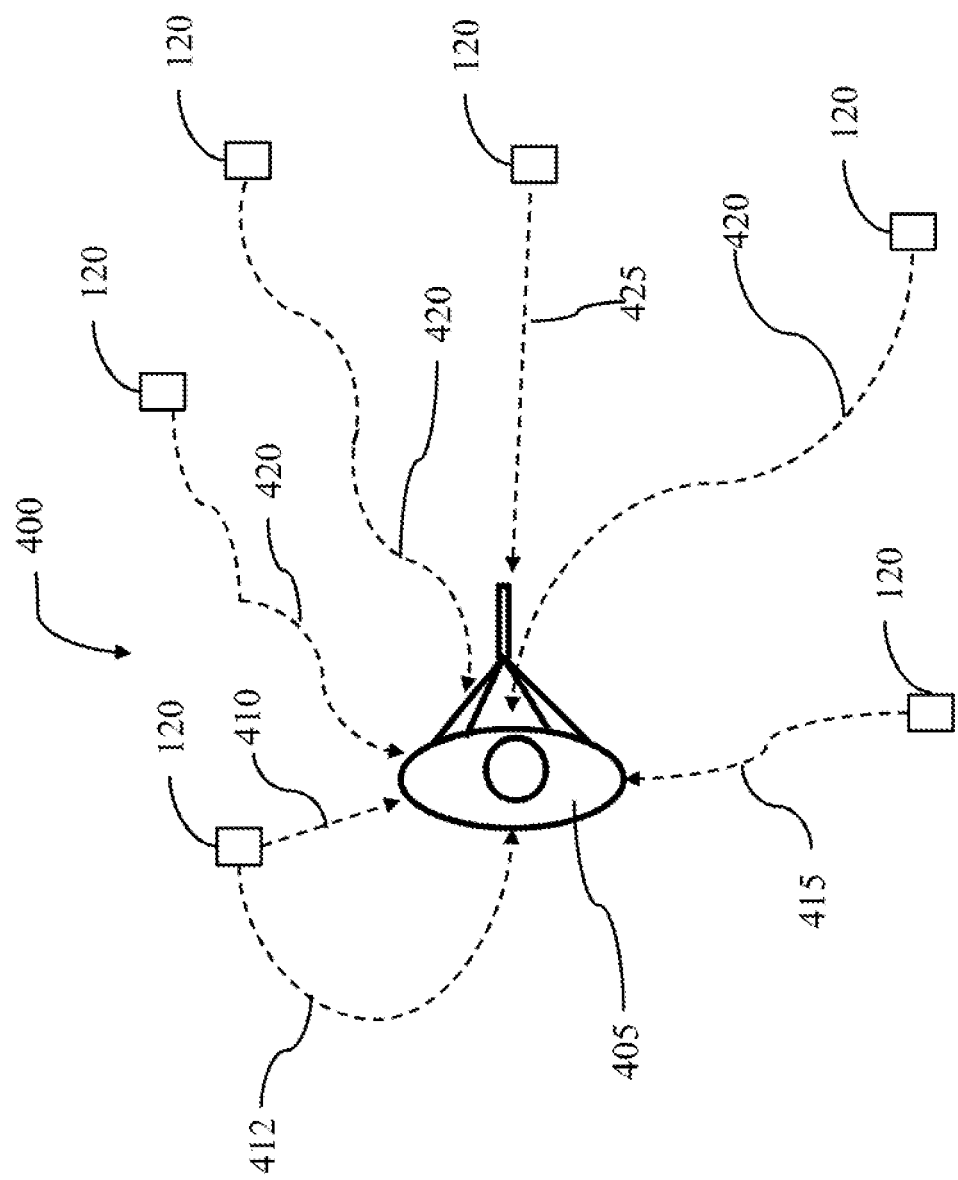
FIG. 4 is a plan view schematic illustrating various UAV attack modes or trajectories upon a targeted threat.

FIG. 4 is a schematic in plan view illustrating various exemplary UAV attack modes 400 or trajectories for assaulting or neutralizing a perpetrator 405 that has been identified by processing UAV sensor information obtained from a plurality of base stations 120 in a grid or random distribution in the sensor monitored space.

The perpetrator 405 can be, for example, a suspected or a positively identified intruder that presents a security risk or threat. The perpetrator 405 can be, for example, armed or unarmed. The UAV attack modes 400 or trajectories can be, for example, predefined or instantaneously reprogrammed in real time based on, for example, the continued movement (e.g., within or toward a restricted or secure area), action (e.g., revealing a weapon), or other threat presented by the perpetrator 405.

The UAV attack modes 400 or trajectories can be, for example: a direct (i.e., straight line from station to perpetrator) flank attack 410; an indirect (e.g., a curved or non-straight line from station to perpetrator) rear attack 412; an indirect flank attack 415; an indirect unpredictable or random attack 420; a direct front or facial attack 425; and like UAV attack modes or trajectories, or combinations thereof.

A preferred attack mode includes, for example, a plurality of attacking UAVs having different trajectories to enhance the probability of neutralizing the perpetrator and avoiding a shoot down or swat down of a defensive UAV by the perpetrator.

Figure 5:
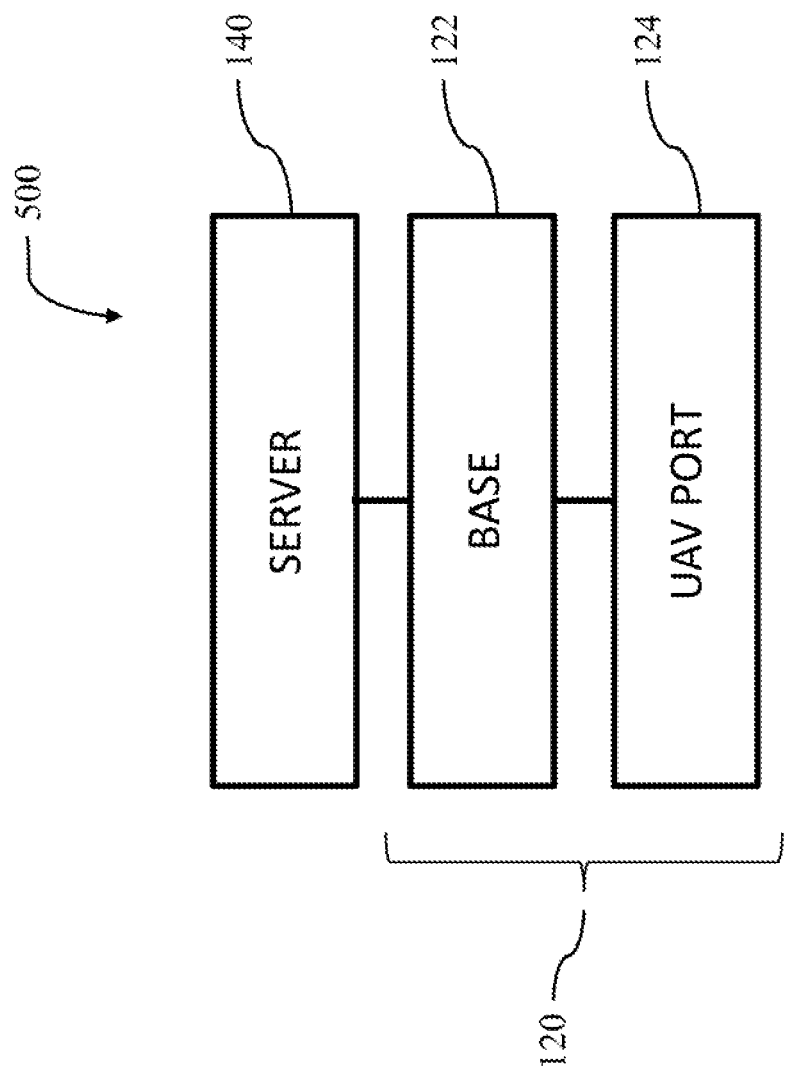
FIG. 5 shows a block diagram summarizing system operation and artificial intelligence ("AI") learning activity.

FIG. 5 shows a block diagram 500 summarizing system operation and artificial intelligence ("AI") learning activity. A system including AI capability can include the aforementioned components, for example: a host base station 120 including a base 122, a UAV port 124, and a server 140.

The server 140 can contain identification information and image data of, for example, authorized individuals, i.e., having permission to be present in the surveillance space.

A computer program or processor associated with the server can detect unusual or unauthorized individuals or configurations. The computer program or processor can be modified to register exception or out-of-normal images or behaviors of authorized individuals in the surveillance space, e.g., halloween costumes, props for theater or show-and-tell (e.g., a toy sword or toy gun), sport equipment (e.g., a lacrosse stick distinguishable from a long gun), play acting, or like images or behaviors.

The base 122 can interpret local data from the UAV sensors, or other sensors, to detect, for example, an unauthorized individual, a weapon such as a fire arm, a behavior such as anger, fear, or aggression, and like image analysis. The interpreted results can be sent to the server as relevant data. The system response can preferably be local and immediate for recognizable threats, and additionally the response can be confirmed by the backend, in advance, when there is an unacceptable uncertainty level of the perceived threat.

If there is no connection between the base and the backend, the base can operate independently using available local knowledge, for example, residing in one of more of the bases 122.

The identification of a threat can be accomplished using AI learnings of the system, for example, the system can learn and optionally can continually learn and update how to identify who is allowed or authorized, and who us not allowed or not authorized in a protected area.

The system includes AI capability that can learn "normal" behavior patterns in the surveillance space such as a class room. A simulation can be accomplished to establish or modify "normal" recorded behavior patterns. The system including AI capability can also learn and discover "abnormal" behavior patterns in the surveillance space. The AI capability provides evolutionary learning, which can keep pace with changes in "normal" behavior and trends. Local data can be collected and then abstracted for simulation, for example, at the facility level or cloud level, so that variations and active shootings can be learned by simulation.

The system can have base station and UAV port capabilities entirely on-board a mobile UAV. Two-way communications can be accomplished, e.g., wirelessly, and UAV power/charging needs can be accomplished, for example, with an appropriately configured docking station for the docked mobile UAV. The docking station portion of the system can also have, for example, an active launch system to accelerate the UAV to a useful flight velocity and avoid expending on-board UAV energy reserves.

Figure 6:
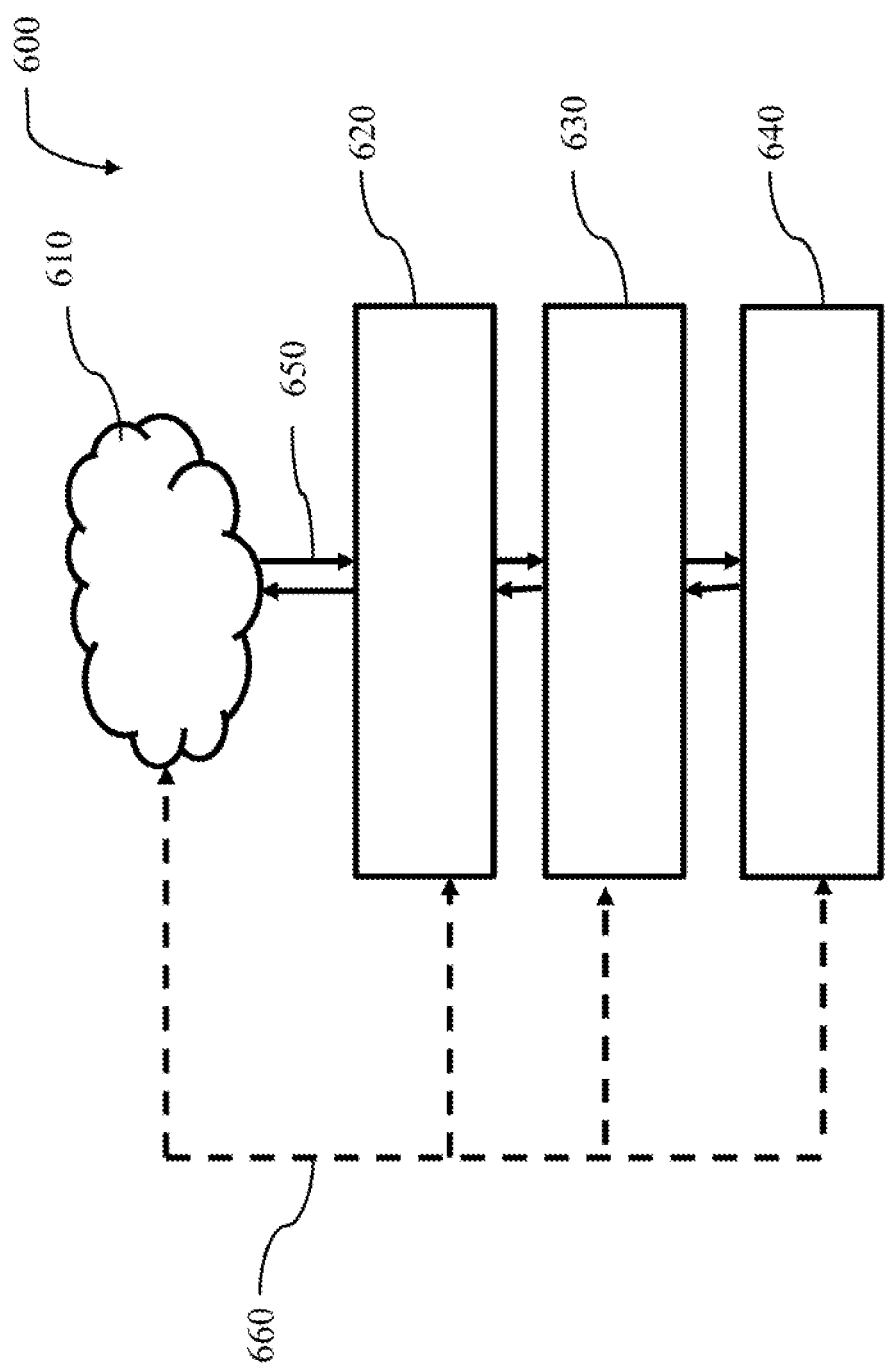
FIG. 6 is a flow diagram illustrating the communication links between or among system components.

FIG. 6 is a flow diagram 600 illustrating the communication links 650 between or among system components including a cloud computer 610, a facilities computer 620, a base station 630, and optionally a docked UAV 640 in a docking station. The communication links 650 can be, for example, hard wired, wireless, or a combination thereof. The communication link 650 can be, for example, direct 650, such as between 610 to 620, indirect 660, such as between 610 to 630 via 660, directly or indirectly among 610, 620, 630, 640, or combinations thereof.

Figure 7:
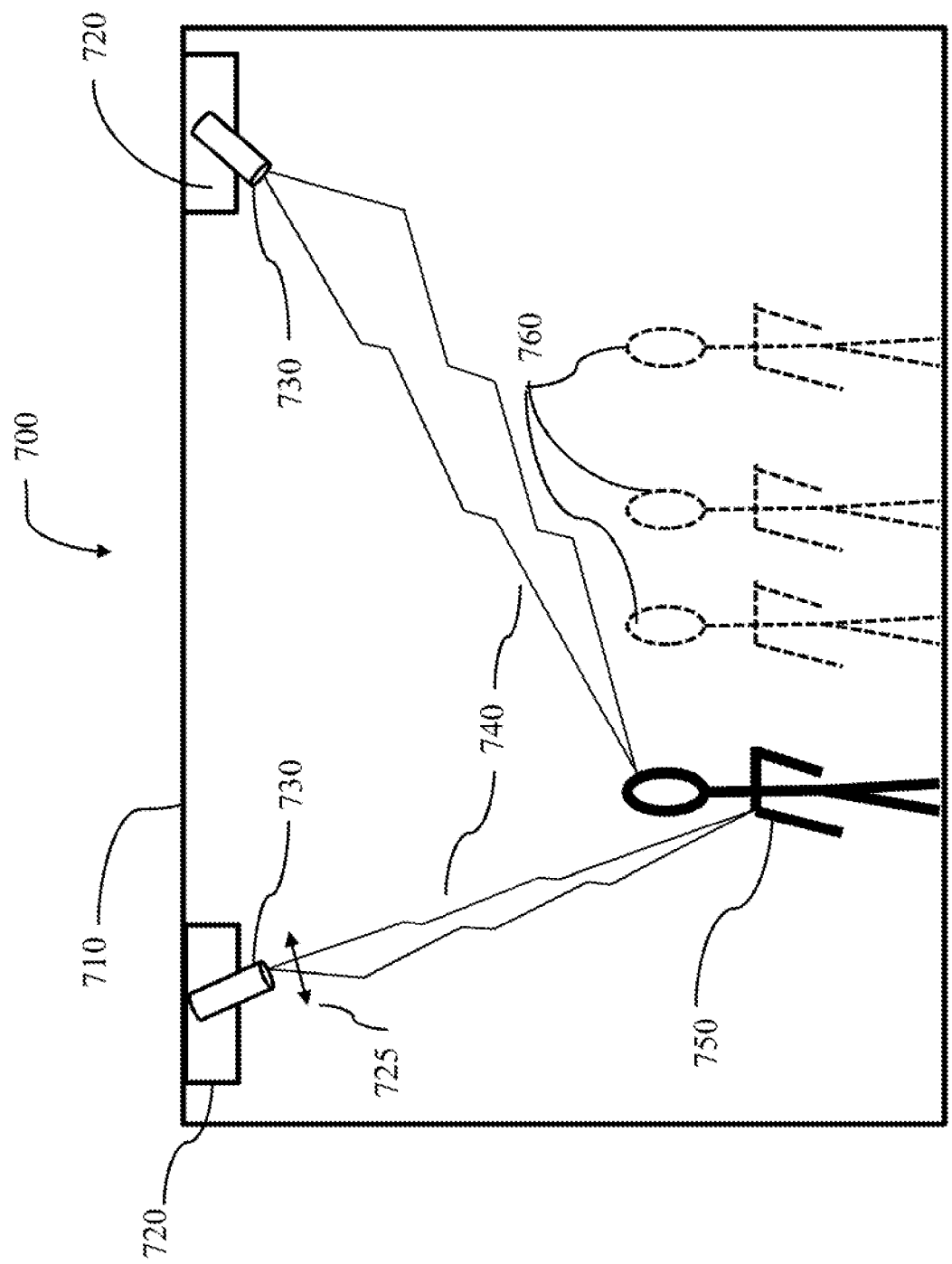
FIG. 7 shows a schematic of a surveillance and attack system without a weaponized UAV.

FIG. 7 shows a schematic of a surveillance and attack system 700 but not having a weaponized UAV, i.e., system 700 is UAV-free. The UAV-free surveillance and attack system 700 can include, for example, a protected area 710, a stationary weapon station 720, and an aim-able 725 (e.g., servo) stationary weapon 730 having a payload such as a Taser or dart gun. The weapon 730 can be aimed at a detected threat 750 among one or more innocent persons 760 by, for example, an associated base station or a remote facilities controller (not shown).

The aim-able 725 and stationary weapon 730 can selectively deploy the payload within a strike zone 740 to the detected threat 750 anywhere within the protected area 710, and among one or more innocent persons 760 that may or may not be present.

Figure 8:
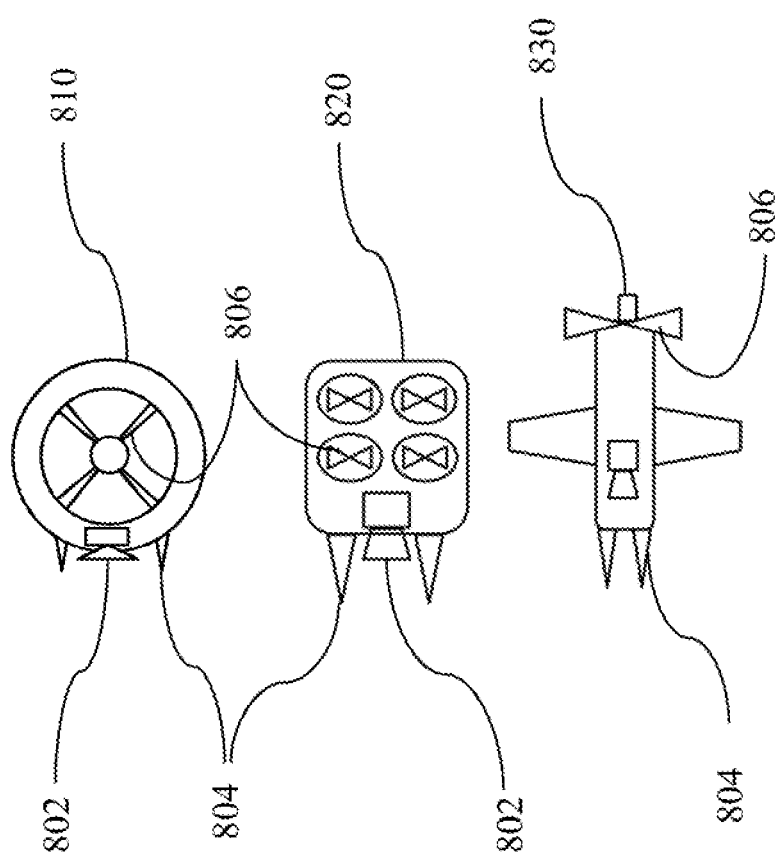
FIG. 8 shows several exemplary weaponized UAV airframes.

FIG. 8 shows several exemplary weaponized UAV airframes. The UAV airframe 810 is an example of a palm sized drone available from Cleorobotics™. The UAV airframe 820 is an example of a quadcopter. The UAV airframe 830 is an example of a drone resembling an airplane having aerodynamic flight controls.

The UAV airframes (810, 820, 830) can have, for example, a sensor 802 (e.g., camera), can be armed or weaponized with a weapon 804, for example, a Taser having one or more tethered or untethered electrodes, and can have on-board propulsion 806, such as a propeller, a bladed fan, a bladeless fan, compressed gas rocket, and like propulsion devices or mechanisms, or combinations thereof. The weapon such as a Taser, a druggable dart, or syringe druggable, can optionally be integral with (e.g., untethered or built-in) the UAV airframe, or separable from (e.g., tethered or severable by launch) the UAV airframe.

The security system has a structural plan and an operational procedure. In each room, area, or space under protection, there can be a set of UAV sensors, e.g., primarily camera based, but additionally or alternatively can be augmented with, e.g., radar, LIDAR, FLIR, or like sensors, that can cover the room and the entire area with continuous sensing. The sensing data feed, e.g., video, can be analyzed locally at a local base to identify, e.g., a drawn weapon, or like unpermitted instrumentalities, a potential fear response from the population in the room or the entire area, or a combination of identification analysis and fear analysis. The sensors can be located, e.g., on the UAV, on the bases, distributed in strategic locations in the area or facility (e.g., near doors), or a combination thereof. The system can have many sensor options or sensor combinations such as visual light, radar reflectivity signature, LIDAR profile, multispectral methods, and like sensing, or combinations thereof.

When an active threat is identified, one or more UAVs can be deployed to disable the identified threat. The UAVs can work together to provide a coordinated attack and defense against the threat target by, e.g., launching a simultaneous attack on the target with, e.g., elusive attack flight patterns.

A UAV without disabling weapons or any weapons of any kind onboard, can be the disabling weapon by way of blunt force delivery of the UAV to the target, i.e., the UAV flies to and into (i.e., crashes) the target.

Each UAV can carry a disabling weapon on board, e.g., an active part of a Taser. When a deployed UAV is in flight the UAV can self-select, or the base can select for the UAV, a suitable "hit" point or area on the target. The UAV then flies to, or flies in close proximity to the target and delivers the disabling weapon payload. Each UAV can also have an algorithm that can select the strength of the disabling weapon response based, e.g., on the estimated size and configuration of the target such as the size, weight, hardness, plurality of targets, and like considerations.

On an operational level, each subsystem can be connected to hierarchical, but independently operating subsystems of the system, where the facility level, e.g., a single facility, aggregates feeds from a specific incident or specific local room, to enable learning and higher level analysis of the situation. As an example, if there is a school lock-down condition, then all UAVs within that facility are activated to a high alert level and can react faster to threats.

On a regional and national level, all of the systems can be aggregated, and global behavior and training for identification, detection, and disabling algorithms can be accomplished by using real world data, as a basis for massive scale simulation or training.

Real world data can be collected from live protected areas such a classroom, where the sensor data including video can be made into abstract models of the area having human actors and objects. The abstract models and actors can be manipulated to allow for variations, for example, the presence of a shooter, and modified in simulation so that training of the disclosed security system can be operated and controlled based on the real world data.

In massive scale simulation and training, the sensor data of scenes can be translated and abstracted to a simulation environment where a plurality of "what if" situations can be simulated. A simulation engine such as a game engine can be selected. A game engine provides a suite of visual development tools in addition to reusable software components.

The security system can include, for example, one or more of the following configurations, components, or characteristics: A threat detection and identification ("TDI") system comprising: a plurality of sensors, where the sensors are the same or different, for the surveillance of a room. The TDI system can be part of a threat, deterrent, and disablement ("TDD") system, or alternatively, can be a separate system.

The TDI system and method can include using, e.g., a camera system or other sensors mounted on the UAV. Additionally or alternatively, the TDI system and method can also have independent sensors strategically placed in the surveillance room. The TDI system and method can operate on continuous power supplied by the facility, operate on backup or uninterruptable power, or both. The TDI system and method can have, e.g., internal computing capability to accomplish image processing, sensor fusion, e.g., from radar, LIDAR, FLIR, or multiple cameras, using image processing methods, such as facial recognition, machine learning, and neural networks, to detect and identify threats. The camera can be, for example, a camera found on a mobile phone or tablet, or a more sophisticated high definition (HD) camera. The sensors can be distributed in the UAVs, the facility, or both.

A threat deterrent and disablement ("TDD") system can be an active part of the system.

A UAV is the component that actively disables a threat. However, the components of the UAV for complete operation can be distributed or shared between a base and a structure that flies, to maximize efficiency and minimize costs of the UAV and the TDD system.

The UAV can be a miniaturized UAV, e.g., about the size of a hockey puck, which can have a self-contained or external propulsion source or mechanism, which can give the UAV rapid speed and maneuverability within range of a target, e.g., 1 to 60 meters. Greater operating ranges can be achieved but can add additional weight and cost to the UAV or the TDD system.

The UAV can be equipped with an on-board weapon system. The weapon system can be, e.g., a Taser, but can be any other suitable weapon option. For a Taser, the main energy source can be located, e.g., in the base, which charges the UAV with just enough energy to reach and disable the target.

Weapon detection can be accomplished visually by camera and image processing. Image processing can be accomplished by having an image processor learn to identify a weapon by, for example: learning all known manufactured weapons, by example, using machine learning techniques such as deep learning and convolutional and recursive neural network methods; learning by using abstract shapes and configuration of known weapons such as hand guns or long guns, so that the shape and configuration of weapon features are learned; and learning by observing people with drawn weapons to generalize from their movement and behavior combining the "person" with the "weapon" as a composite and to learn a higher level behavior; and like learnings, or combinations thereof.

Scaling challenges can occur in image processing based object detection and identification. Knowing or having learned, for example, the dimensions of the room and its objects, and having multiple cameras in different location on the target, an adversarial weapon can be characterized in greater detail. The size of a suspect object can be reasonably estimated using the room dimensions as a reference. The relative size of an object can also be estimated by comparing the object size to a person carrying the object, and bracketed by the estimated distance to the object from the reference room dimensions. Objects in the room can be used to estimate distance and size of a threat object or a suspect object. For example, the distance to the floor for each pixel in an image can be known by geometry. The height and the position of the threat or suspect object can be calculated from the number of pixels from the floor and angle.

Weapon detection can be accomplished by, for example, extracting a part of the image that contains the object, scaling it properly, and then providing extracted and scaled data to a machine learned detector for identification.

Weapon detection can be accomplished by, for example, using LIDAR, RADAR, SONAR, an auto-focus system, and like sensing, or combinations thereof, which sensing can assist in distance measurement. Distance measurement can be actively accomplished by, for example: triangulation using a plurality of bases at different locations and determining an angle to the object, and determining an accurate estimate of the size of the object; using an active sonar return from the object; using a LIDAR (e.g., a simple range finder); using a RADAR (e.g., an automotive style, or short range facial recognition radar); using a time-of-flight camera and structured light such as the Kinect game controller; using an autofocus camera system to generate a distance map to estimate distances to an object, or a combination thereof.

Detection of concealed or hidden weapons can be more difficult and have additional challenges. A millimeter wave radar system can be used to "see" beneath clothing, and detect shapes, at least at short distances, of metallic objects carried by individuals. This has the additional benefit being able to operate in low light or no light scenarios.

A radar having a processing system can learn to identify the radar return signature of known weapons, i.e., a composite of a scatterer created by the shape of the object, and is a common method in radar object detection of large objects such as aircraft, tanks, and like objects.

In the security system, having relatively short distances, very high frequency radar, and very high resolution can augment known radar methods to permit the system to work indoors to identify small objects, such as guns, knives, and rifles. Such a radar system can work similar to, but not identical to, a backscatter detector used in airports, except that a direct profile from the radar scan can be used for detection.

LIDAR can provide a highly accurate distance and location map of the entire room including the perpetrator and the weapon, and function in the dark. Commercially available LIDAR sensors are costly but are becoming more affordable. With a LIDAR sensor a high resolution pixel cloud can be obtained and a weapon, its size, and its location could easily be determined. A limitation of LIDAR is that it is unsuitable for detecting concealed weapons beneath clothing or in a backpack, where a radar sensor can excel.

Using near infrared imaging, for example, removing the IR filter from a CMOS image sensor, heat signatures can be used for object detection without visible light. Near infrared imaging can be an extension to a visible light camera system, to provide a heat signature of objects to enhance detection of a weapon.

An infrared light source can be used to provide active non-visible illumination of a room without disturbing the people in the room. This can be an advantage if, for example, the room is dark. However, in many intended operational scenarios there will be enough ambient or artificial light in the room for a highly sensitive camera system to work properly. An infrared light source can be used, for example, in tardy detection (e.g., after weapon discharge) in identification and localization of, for example, a gun shoot. The system can then rapidly determine from the infrared sensing what and where the tardy detection is.

A fully trained base and UAV combination can operate in a standalone fashion, i.e., autonomously, or in combination with several other base and UAV combinations, and without other subsystems. An autonomous base and UAV combination can have a detection system embedded in the combination, and does have or not need any outside communication. A limitation of an autonomous base and UAV combination is isolation, and autonomous base and UAV combination is without facility wide view of events. However, an autonomous base and UAV combination can be modified to communicate with other autonomous base and UAV combinations but without a facility controller, to provide coordinated room protection and facility protection.

An autonomous base and UAV combination, such as a single combination or a plurality of combinations, can be used independently as an area protection unit, for example, for a single room, a classroom, a home, restaurant, and like areas.

The system provides a unit, such as an autonomous base and UAV combination, which can autonomously detect an active threat (e.g., a shooter), and actively deploy a disabling (e.g., non-lethal) and disarming response. The detecting can be accomplished by, for example: image acquisition and processing; the sound of gun fire or gun shots; the heat from a gun muzzle; a radar signature, and like detections, or combinations thereof. An active response can be accomplished by, for example: launching a miniaturized, weaponized UAV to disable an attacker; launching a Taser from a UAV or a base to disable an attacker; launching a UAV as a kinetic weapon to disable an attacker, or a combination thereof.

It may be desirable to moderate an active response by determining, for example: the size of target; the hardness of target; the severity or extent of an attackers attack method, e.g., a knife, a hand gun, an automatic weapon, a bomb, or other weapons.

The system provides a security system having a plurality of UAVs where each UAV has a different location. The plurality of UAVs having different or separated UAW locations can be used to protect the same area. The plurality of UAVs having different or separated UAW locations can, for example, triangulate objects within the area, and can estimate the size of the objects. Launching a plurality of UAVs having different or separated UAW locations can, for example, increase probability of success and can confuse a target.

The system provides a security system having a UAV weaponized with, for example, a Taser. The Taser weaponized UAV, whether stationary or in flight, can deploy, for example, tethered barbs or prongs to the target. The Taser weaponized UAV can have untethered electrodes (e.g., barbs or prongs) on an outer surface of the UAV, which are deployed by the UAV directly contacting (i.e., flying or crashing into) the target. Untethered direct contact is known as "drive stun" capability and was intended to cause pain but not incapacitate.

A Taser weaponized UAV can have "drive stun" capability that can be modified, for example, to cause pain and incapacitate.

If the Taser weaponized UAV having tethered barbs or prongs (i.e., electrodes) is heavy, the UAV can fall to the floor after deploying the electrodes to the target so that the Taser shock current is not unnecessarily consumed in maintaining the flight of the UAV. It may be desirable to maintain propulsion power to the UAV to, for example, stabilize the UAV flight, maintain image acquisition and situational awareness, create a Taz-cam image record, or continue delivering payload.

The system provides a security system having a base, without a UAV (i.e., free of a UAV), that is weaponized with, for example, a Taser, or like weapons. The weaponized base in such a system can be an autonomous detection and autonomous deployment unit. The weaponized base can have a sufficient number of weaponized bases to cover the protected area and a sufficient capacity to disable or neutralize the target attacker. The weaponized base can shoot the target attacker when the target attacker is detected. The weaponized base without a UAV is advantaged by lower cost. A system without a UAV can be disadvantaged by, e.g., having a higher vulnerability to attack or counter attack from the target. However, disadvantages of a stationary weapon having, e.g., a visible or a known location, can be mitigated by, for example, concealing or camouflaging (e.g., using paint that matches ceiling tile or fixtures, screening, or recessing the weaponized base into the walls or ceiling). Additionally, a stationary but directionally adjustable (i.e., aimable) weapon can be, for example, aimed easily, can shoot before the target attacker shoots or acts, can shoot multiple shoots before reloading, and can have very high accuracy.

The system provides a security system having an active threat response unit comprising, for example, a weaponized and miniaturized UAV, a docking station for the miniaturized UAV, and a base with operational power and compute power. The one or more miniaturized UAVs can be deployed to deliver a non-lethal weapon to a target. The miniaturized UAV can be small, for example, the size of a hockey puck or a double A battery, and preferably free of non-essential parts to limit the need for onboard energy and to permit a short flight, e.g., as 1 to 30 seconds, such as a 3 to 10 second flight. The miniaturized UAV can be launched by, for example, a stationary launcher in the docking station, to attain satisfactory flight velocity. The miniaturized UAV can optionally have and use aerodynamic flight controls (e.g., rudder, aileron, elevator, or stabilizers) for enhanced lift, flight characteristics, and directional control. A weaponized and miniaturized UAV can be armed, for example, with a Taser, and the Taser can optionally be integral with or separable from the UAV (i.e., untethered or tethered).

The system provides a security system having a base that can launch a miniature UAV to deliver a weaponized payload to a target where, for example: the UAV can be selected for a short flight; the UAV can use aerodynamics to steer in addition to onboard motor propulsion; the UAV can be weaponized with a Taser; the sensors can be located on a base; the base can remotely control the flight of the UAV to the target; the sensors can be distributed between the UAV and the base; a simple targeting system can be located on the UAV; the sensor can be a camera and the sensor can optionally include RADAR, LIDAR, or like sensing, located on the base.

The system provides a security system having a limited area for UAW weapon delivery where, for example, the UAV can be launched from above and does not have to gain altitude. The UAV can be launched from a height above the target. The UAV can get initial flight energy from the base before take-off, e.g., charging. The UAV can get assisted takeoff, e.g., with a launcher, to minimize UAV size and weight.

A facility controller aggregates information received from a distributed set of sensors, such as a base and UAV combination, to acquire facility wide situational awareness. A facility controller can actively track each individual in the facility, for example, to enable pattern analysis and detection of non-standard or abnormal behavior (e.g., person X normally does A, B, and C, but now instead does D). A facility controller can enable system learning by feeding information from individual locations, such as protected areas, to the facility level.

The system provides a security system further having a connection to cloud based machine learning. The connection to cloud based machine learning can be, for example, local, regional, or global. The connection to cloud based machine learning can aggregate situations recorded by the facilities. The aggregated situations can be abstracted to scenarios, and the abstracted scenarios can be modified to enable learning of likely attacker behaviors.

The cloud based machine learning can be, for example, transmitted back to the base stations to train or retrain the base stations, and improve response accuracy and performance over time.

A distributed control system is based on small UAVs, and the distribution of computation can be located at, for example: the leaf node bases holding the UAVs; the UAVs; and a centralized backend that can contain large compute power, long term storage, and control.

In the distributed control system embodiment, "base" refers to the computer system, a launch pad or launch mechanism, and charging station for the UAV. The base can contain some non-flying parts of the UAV such as a launcher, a charger, a laser pointer for guidance, and like components. The base can contain parts of the sensor system used for detection of the threat, guidance of the UAV to the target, or both.

In the distributed control system the "base" can be responsible for local detection of threats, and optionally can be in cooperation and communication with an alarm system and the backend system. The backend can inform the "base" of, e.g., operational mode changes, high-alerts, a known "good" or authorized person entering with gun (e.g., police officer, security), or updates to detection algorithms. The base can also be responsible for sending data to the backend for aggregation, analysis, and long term storage.

The distributed control system in the base can be responsible for immediate operations and detections, and the backend can be responsible for advanced analysis and long term collective learning.

The base can have local battery storage for operation in a non-power environment for a suitable number of hours in the event of a power disconnect or outage.

The base can operate using its own power and its own compute capability independent of any other bases or the backend.

The machine learning system can be trained to respond correctly to different people and situations based on machine learning techniques, using the base stations as data collection units for learning "normal" behavior.

In addition, synthetic scenarios can be generated in simulation for detecting aggressive behavior, weapons (e.g., long or short guns), or fear behavior in the protected population.

The machine learning system can operate having, for example, the backend connected to the bases in the system via a network connection. The bases can operate the UAVs and the docking stations as independent units, but can rely on the backend for deep analysis and global connection.

Making each deterrent node (i.e., a sensing entity such as an individual UAV sensor or a plurality of UAV sensors, other non-UAV sensors, or a combination thereof), independent, a resistance or resilience to denial of service attacks can be improved, and sensing and network intrusion attacks can be minimized.

The system provides a school "Triple-D" (Deter, Detect, Disable) system including, for example: a main server (i.e., a backend) for managing the entire system. The main server can also be the central location, for example, for distributing global alarms and performing deep analysis, for example, if not cost effective to do at an individual base.

Each area, e.g., class rooms, corridors, gymnasium, and like areas, that needs security protection can have a set of UAVs that survey or monitor each area.

Each UAV or docking station can be equipped with sensors, e.g., visual imaging or LIDAR, and optionally radar or infrared (e.g., forward looking infrared (FLIR); see also FLIR's Cameleon V5 Enterprise off-the-shelf perimeter intrusion detection software on flir.com) for enhanced "all weather" operation such as where, e.g., fog, mist, dust, smoke, or like dispersions can interfere with visual imaging or LIDAR.

When a threat is detected and determined, one or more of the UAVs can be deployed in the area to disable the threat.

Threat detection and identification can be accomplished by, for example, manual detection, anomaly detection, object detection, behavioral detection, pattern-of-life detection, and deviations thereof, and like detections, or a combination thereof.

The success of the system and activated counter-measures can be enhanced by, for example, two or more, preferably all available threat detection and identification methods.

In manual detection, a response by the system can be triggered or activated by a friendly or an authorized human, i.e., a non-threat person. An authorized human can activate the system, e.g., to lower detection thresholds and trigger a counter measure response. An authorized human can activate the system by, for example, pointing a laser on a target, for example, a suspect human, or a suspect weapon. The target identified by the pointed laser can be communicated and linked to the system. The system's sensors, for example, can detect the laser illumination on the target and use radar-lock or laser-lock methods for precision guiding or vectoring of, for example, a UAV defensive attack, or a stationary defensive weapon launch and attack, on the identified target (e.g., using missile guidance and guided bomb method variants, with or without a guidance tracker).

In sensor detection, a response by the system can be triggered or activated by, for example, an audio sensor sensing a gunshot, an IR camera sensing a hot gun muzzle, a flash detector sensing a gun shot, and like sensor or sensing detections, or a combination thereof.

In object detection, a response by the system can be triggered or activated by, for example, an imaging sensor (e.g., video, IR), detecting objects that are threatening such as guns, knives, improvised devices (e.g., a propane tank, pipe bomb, and like devices), or a combination thereof.

In behavior detection, a response by the system can be triggered or activated by, for example, analysis of video (e.g., visible or IR) detecting abnormal behavior such as fleeing or fear, abnormal or anomalous patterns-of-life, students fleeing into a room or from a room, an authorized person or a target person barricading an entry-way, and like behaviors, or a combination thereof. Behavioral detection can have risks of, for example, a potential false positive or a missed response. Behavioral detection methods must be tailored to avoid a miss-identified target or threat that can result in undesired and unintended harm to innocent persons (e.g., identifying non threating aberrant behavior due to a medical or similar emergency). Behavioral detection methods can be tailored, for example, with machine learning, artificial intelligence, and like technology, or combinations thereof.

A single UAV can be deployed in each protected area, but the UAV attack accuracy may need to be increased because of the reduced probability of successful disablement by a single UAV.

A plurality of UAVs such as three UAVs can be a sufficient number for adequate detection and for sufficient probability of disabling or neutralizing an adversary.

Where a plurality (e.g., a gather or flock) of UAVs are deployed in a single protected area or multiple protected area, these UAVs can work cooperatively as a team, so that the attack can be coordinated, e.g., simultaneous or waves, to make it difficult for the target to defend against or repel the plurality of attacking UAVs.

The UAVs can fly to the target in an evasive or elusive pattern making it difficult for the adversarial target to focus any single one of the attacking UAVs.

Each UAV can be assigned to a single docking station, i.e., a single UAV and single docking station 1:1 configuration. The 1:1 configuration can be, for example, connected to power and network connectivity such as permanent hard wired power, wireless power, wireless network, or a combination of power and network connectivity A 1:1 configuration can have all non-essential or selected components of the UAV residing on the single docking station, for example, base system electrical charging, battery power charging, charge source and circuitry for a Taser, UAV fuel, a fluid delivery system for, e.g., a defensive chemical spray, and like components for arming a UAV or rejuvenating a used or an exhausted UAV.

A single docking station can have multiple UAVs, i.e., a 1:x configuration where x can be, for example, from 2 to 20. However, for superior protection and difficulty-to-defeat, the above mentioned 1:1 configuration is preferred due to superior spatial disparity or separation between a plurality of docking stations making a plurality of 1:1 configurations less susceptible to a single shot defeat by the adversary.

A UAV having minimal size and weight can have many advantages such as low cost, high probability of adversary defeat, high speed, required power, rapid rejuvenation for reuse, and like advantages.

A UAV having a flight time of 10 seconds or less, almost no battery power needs to be carried aboard the UAV.

The weight of a weaponized UAV can preferably be minimized by having all non-essential components of the security system separated from the UAV and resident in the docking station.

For a UAV mounted above the secure area or launched from an overhead docking station to the adversary altitude, additional lift power for the UAV airframe is unnecessary. Only power for UAV direct attack or maneuvering is necessary.

A weight minimized UAV can be equipped with a sensor, e.g., a camera, and flight control system, e.g., a computer for analyzing the image data from the sensors, that can retain an acquired target and have enough accuracy to fly to the acquired target and hit a specific mark on the acquired target to deliver a payload.

A weaponized and sensor equipped UAV can provide a projectile having smart capability that can steer the UAV to an acquired target with high reliability.

The initial acceleration of the UAV, which can be the greatest energy need for deployment, can be accomplished by, for example, any suitable launch system built, for example, into the base station. A launch system can include, for example, compressed gas (e.g., air or $CO_2$), an elastic band (e.g., a sling shot structure), a coil or spring launcher, a rail type electromagnetic accelerating launcher, and like launch forces and structures.

The system provides a detection and interception ("D&I") security system including a layered set of cooperating subsystems. A first subsystem in the D&I security system can be a global cloud based system responsible, for example, for aggregating data from all secure areas (e.g., one or more schools). This first subsystem can, for example, continuously train the other subsystems to improve their D&I operation over time. This first subsystem can, for example, be responsible for monitoring abnormal behavior across the network of secure areas to detect, intercept, or both, perceived or actual tampering or other abnormal events.

A second subsystem can, for example, reside in a localized area, such as a secure school or facility. The second subsystem can, for example, be responsible for local operation at the facility. The second subsystem can, for example, collect local user data, such as persons who are supposed to be present or authorized in the location, determine what normal behavior is, and determine what normal operation is, which can all to be used to minimize the probability of false positives.

A third subsystem can be, for example, at the local room level having docking stations and UAVs. The docking stations are responsible for local room level surveillance. The third subsystem can use the sensors on the UAVs, and provide compute power and energy to the UAVs, or they can have additional sensors to provide better sensing quality than only UAV sensing.

A fourth subsystem can be at the at the level of the UAV where, for example, the UAV operation and performance can be, for example, managed, enhanced, altered, updated, and like controls and modifications to minimize CSWAP, while maximizing non-lethal disabling power.

Each second subsystem can be responsible for monitoring a specific area, for example, a classroom. In the classroom the UAVs, base stations, and the connected sensors can maintain continuous surveillance. Prior to actual operation, the second subsystem can be trained to know what a room looks like and where common features are located. These features can be, for example, doors, exit signs, windows, lights, furniture, desks, common accessories, apparatus of the disclosed security system, and like structures.

Each second subsystem can be trained in advance to recognize standard objects present in the rooms. For example, when the sensor activation is established the geometries of objects in the room can be properly measured and identified.

A rudimentary second subsystem can use sensing cameras, and additionally or alternatively sensing radar, LIDAR, or both, to detect a weapon in the room. Having relatively short distances, e.g., several meters such as 1 to 20 meters, between a sensor and a weapon, the use of modern image and sensor processing techniques can readily sense a drawn or concealed weapon, and optionally determine whether the sensed weapon is permitted (i.e., friendly) or an adversary weapon (i.e., a foe) based on the above mentioned prior training.

A second subsystem can provide an additional security feature where the occupants of a room (e.g., a class or a crowd) can be observed during an event, and a "flight" or a "fear" response can be analyzed and integrated into the disclosed security system's memory. For example, a "flight" or "fear" response can be used as an additional layer of safety for the protected occupants, or to detect threat situations where an adversary weapon is not adequately visible to the sensors.

When a target has been detected and optionally verified, at least one of the UAVs in the system can be deployed to disable the target. The target information can be communicated to the UAV, which UAV can lock onto the detected target. Next, a base station launches at least one UAV. Alternatively, at least one of the UAVs can launch itself. A launched UAV can use an evasive flight pattern to hit the target in a predetermined venerable area of the adversary. For a Taser weaponized UAV this can be, for example, face, neck, hand, chest, back, or like areas, or combinations thereof, depending on the sophistication of the UAV controls.

If multiple UAVs are deployed they can fly different patterns to confuse the target and time the UAVs hits to maximize the disabling effect on the system's weapon on the adversary or the adversary's weapon.

A Taser weaponized UAV can be equipped with a high power Taser prod similar to police-style tethered Tasers. With a high power Taser prod the energy source for the Taser can be onboard the UAV and having sufficient charge for a single hit. The sufficiently high charge and discharge strength is also sufficient to disable the target.

The image processing capabilities in the base, the UAV, or both, can be used to estimate the size of the target, and the strength of the ordnance can be adjusted to maintain at sufficiently disabling but safe, i.e., non-lethal, level to avoid permanent bodily harm to the target.

When a Taser weaponized UAV contacts the target, e.g., direct contact or by tether extension, the deployed Taser prods can, for example, penetrate clothing or the target's skin but the prods stay near the skin surface. When the prods contact the target an electrical jolt can be delivered to the target.

The response time of the proposed system shall be as rapid as feasible. Specifically, human reaction time to a single, unanticipated event is approximately 300 to 500 milliseconds. Therefore, the system could be designed to be deployed within this period and disable the target before the target can react to the countermeasure.

A UAV can be launched from a base in the direction of the target. To minimize the weight of the UAV, an initial acceleration of the UAV can be supplied by the docking station equipped with an above mentioned launcher mechanism. A docking station launcher can accelerate the UAV to an effective initial velocity of, for example, 5 to 15 m/s, such 10 m/s.

UAV maneuvering can be accomplished by control motors onboard the UAV and that can provide enough power to fly an attack pattern, for example, of about 10 seconds.

A fully equipped UAV can have total weight of less than, for example, 250 g, or preferably less.

When a target is detected and a "disarm and disable" operation is initiated, all of any other second subsystems can be alerted and transition from normal operation to high-alert operation such as in a facility "lock down" status. In high-alert operation the second subsystems can have heightened sensitivity, for example, to any moving objects or people, and that can monitor the entries of each room. If any person is not positively detected and identified as authorized (i.e., "friend"), the second subsystem can immediately deploy one or more UAVs in close proximity to disarm an unauthorized person or entrant (i.e., "foe").

The second subsystem operating on the facility level can also provide a backup or a supplement for the docking stations by providing, for example, reports, alarms, or both, to first responders. When an alarm is activated from sensory detection and analysis, the second subsystem can send an alert to a facility controller such as human administrator or an automated administrator, and then, as a redundancy, to the first responders such as facility resident first responders or local external first responders such as dispatched by public or private 911 emergency response services. The second subsystem operating on the facility level can monitor and analyze one of more sensing node, e.g., an individual or plurality of UAV sensors, other non-UAV sensors, or a combination thereof, to deduce and trigger an alert alarm.

The following examples demonstrate making, use, and analysis of the system and methods in accordance with the above general descriptions and procedures.

In a first example, a small, lightweight, and inexpensive UAV is preferable. To protect a room, only a several seconds of UAV flight time is necessary, e.g., at speed of 10 m/s, of from about 2 to about 6 seconds is needed.

Initial acceleration of the UAV from stationary to flight velocity can have significant energy consumption. However, the initial acceleration of the UAV toward the target can be accomplished by an abovementioned external energy source, propulsion mechanism, or both provided by the base (e.g., a sling shot or an electromechanical launcher).

A Taser needs an energy source and energy storage, but the energy storage can be built into the UAV airframe. Alternatively or additionally, most of the high voltage circuitry for the Taser can reside in the base, and only store the high voltage active charge on the UAV.

With lightweight and velocity assistance, the UAV does not need to hover. Energy and launch propulsion can be minimized by a UAV that resembles, e.g., a fixed wing aircraft.

With an initial lift or elevated setup above the protected room, the UAV does not necessarily have to gain altitude or land, just maneuver to the target with level or descending flight.

The UAV flight control system can be simplified to use camera and local guidance from the base or the facility for targets already acquired to limit the local compute capability, and save CSWAP requirements for the UAV. The base can communicate with the UAV and direct the UAV, for example, over a wireless link. Care must be taken to avoid communication protocols that are easily hacked or jammed. Techniques such as channel hopping and encryption should be employed to mitigate these risks.

Nothing prevents the use of larger fully independent UAVs, or the use of full compute capability on the UAV. However, consequent increases in CSWAP requirements may be counterproductive.

In a second example, the UAV can be further simplified with, e.g., an active launch pad, having all but the flight controls onboard the UAV. The base can control the UAV via a (e.g., directed) wireless communication (e.g., a laser, but other radio methods can be suitable) to guide the simplified UAV to the target. In this configuration the system operates more like a smart guided missile system, with the controls and sensors in the base rather than in the UAV (see, e.g., the abovementioned precision guided methods). The further simplified lightweight UAV can have, e.g., greater speed and lower cost.

In a third example, the security system can be configured with, for example, a detector that senses and detects a physical threat to persons in a protected area; and a weaponized base station in the protected area that deploys a guided weapon to disable the detected physical threat. The security system without a UAV can provide security comparable to a UAV equipped security system, and can provide operational, performance, and cost advantages or alternative solutions to a UAV equipped security system.

The system provides a system and method that detects, deters, and disables, one or more perpetrators, for example, in a school shooter event, or like events or venues. The system and method can be useful in many similar situations where an area needs a defense against a potential shooting event, e.g., a school, a classroom, a restaurant, a hotel, an office lobby, an office building, a lab space, an auditorium, a sport arena, and like controlled soft-target environments.

The system and method can be useful in any venue where a perpetrator need to be disabled with some force, preferably a non-lethal, force.

The system can operate autonomously by, e.g., monitoring an area, detecting active threats with, e.g., sensors, and ultimately deploy countermeasures, e.g., a defensive weapon, to disable a perpetrator or like threat.

The system can analyze, e.g., with artificial intelligence or deep learning, collected sensor data to enable the system to learn how to better detect normal and abnormal situations. This analysis and learning is especially useful for detecting different kinds of weapons, such as standard production firearms, and improvised firearms or devices.

The system provides a security system comprising a detector that senses and detects a physical threat to persons in a protected area; and a weaponized base station in the protected area that deploys a guided weapon to disable the detected physical threat.

The guided weapon can be guided by the weaponized base station toward the detected physical threat, and the weaponized base station receives weapon guidance information (i.e., intelligence) from the detector.

The weaponized base station can be, for example, a plurality of weaponized base stations in the protected area.

The physical threat can be selected from, for example, an adversarial person, an adversarial weapon, an adversarial machine, an adversarial object, an adversarial behavior, an anomalous behavior, or a combination thereof (e.g., a person, a weapon, a robot, or a combination thereof).

The guided weapon can be selected from, for example, a Taser, a druggable dart (e.g., a tranquilizing dart), a chemical irritant spray, a blunt force object, and like non-lethal weapons, or a combination thereof.

The detector senses and detects the physical threat with, for example, facial recognition software, object recognition software, vision recognition software, and like recognition tools, or a combination thereof.

Computer vision recognition tools using, for example, a HD camera sensor, can be selected to target and follow a live subject to provide, e.g., an autonomous flying drone, based on a visual tracking system.

The security system can further comprise a launcher, situated in a weaponized base station, for launching a guided weapon. The launcher can be selected from, for example, a propeller, compressed gas, an elastic band, a coil launcher, a spring launcher, a rail type electromagnetic accelerating launcher, and like launchers, or a combination thereof.

The security system can be free of a UAV.

The system provides a security system comprising: a detector that senses and detects a physical threat to persons in a protected area; and a weaponized UAV situated within the protected area to neutralize a detected physical threat, the weaponized UAV is in communication with the detector and detection of the physical threat.

The security system can further comprise at least one of: a weaponized UAV computer, a base station, a base station computer, a facilities computer, a backend, a cloud computer, a plurality of weaponized UAVs having physical separation, or a combination thereof.

The security system provides a method for detecting and neutralizing an active shooter, comprising: detecting a physical threat to an innocent population in a protected area; and deploying a weaponized UAV situated within the protected area to neutralize a detected physical threat.

The detecting can be selected from, for example, manual detection, anomaly detection, object detection, behavioral detection, pattern-of-life detection, and like detection methods, or a combination thereof.

The detecting a threat to an innocent population in a protected area can be accomplished, for example, with facial recognition software processing of all persons in the protected area.

The detected threat can be, for example, selected from the above mentioned adversarials, behaviors, or a combination thereof.

The system provides an active shooter neutralization system, comprising, for example: an imager (e.g., a still camera, a video camera, a video surveillance camera, a network of live video surveillance cameras, and like imagers, or combinations thereof) that first records an image of each person in a secure area in an authorized image database (i.e., an image reference), and that secondly records a contemporaneous image of each person in the secure area (i.e., an image reference); an image analyzer that analyzes (i.e., compares) the first recorded image of each person in a secure area in the authorized image database with the recorded contemporaneous image; if each person in the area has a recorded contemporaneous image that corresponds to the first recorded image in the authorized image database then only authorized persons are present; if each person in the area does not have a recorded contemporaneous image in the authorized image database that corresponds to the first recorded image then an unauthorized person and a suspect active shooter is detected (i.e., present); and a weaponized UAV having an imager (e.g., one or more video cameras), ordnance, and ordnance delivery, the UAV is in communication with the image analyzer for guidance to, and neutralization of the detected unauthorized person or suspect active shooter in the area.

The ordnance of the weaponized UAV can be, selected from, for example, an explosive, a stun grenade, a Taser, a tranquilizing dart, a chemical irritant spray, live ammunition, and the ordnance delivery of the weaponized UAV is a launch system that can be, selected from, for example, a propeller, compressed gas, an elastic band, a coil launcher, a spring launcher, a rail type electromagnetic accelerating launcher, or a combination thereof.

The launch system can be, for example, situated on the UAV, situated separate from the UAV, or a combination thereof.

The system provides a method for detecting and neutralizing an active shooter comprising collecting archival images of each person in an area with at least one imager (e.g., as mentioned above) to form an archival image database of authorized persons; collecting contemporaneous images, at a later time from the collecting archival images, of each person in an area with at least one imager (e.g., as mentioned above); and comparing the collected contemporaneous images of each person with the archival images of each person in the archival image database of authorized persons to determine if each person is an authorized person; if a person in the area does not have a contemporaneous image that corresponds to an image in the archival image database, such person is not authorized to be present and an unauthorized perpetrator is identified (i.e., present); and launching a weaponized UAV situated within the area to neutralize the identified unauthorized perpetrator.

The method for detecting and neutralizing an active shooter neutralization, can further comprise collecting archival images of authorized weapons (e.g., a security guard hand gun, a teacher carrying a protective chemical spray) in the area with the at least one imager to form an archival authorized weapons database of authorized weapons; collecting contemporaneous images of weapons in the area with the at least one imager, at a later time from the collecting archival images of authorized weapons; and comparing the collected contemporaneous images of weapons with the archival images of authorized weapons in the archival image database to determine if a contemporaneous image of a weapon is an authorized weapon; if a weapon in the area does not have a contemporaneous image that corresponds to an image in the archival weapons database, such weapon is not authorized to be present and an unauthorized weapon is identified (i.e., present); and launching the weaponized UAV situated within the area to neutralize the identified unauthorized weapon, an unauthorized perpetrator in possession of the unauthorized weapon, or both.

The system provides a method for detecting a perpetrator comprising collecting live video images of each person in an area with at least one video camera; and analyzing the collected live video images of each person to determine if each person is an authorized person; and if each person is not authorized then a potential unauthorized perpetrator is identified (i.e., present).

The analyzing can compare the collected live video images of each person for an image contained in an authorized image database and the potential unauthorized perpetrator does not have an image contained in the authorized image database (i.e., relational database null marker condition).

The method can further comprise, for example: analyzing the collected live video images of each person for the presence of a weapon; analyzing the collected live video images of the potential unauthorized perpetrator for the presence of a weapon; sounding an alarm if the potential unauthorized perpetrator is identified (e.g., general alarm or local alarm); apprehending the potential unauthorized perpetrator; initiating an attack by the security system on the potential unauthorized perpetrator, and like actions, or combinations thereof.

The attack can comprise, for example, a physical assault on the potential unauthorized perpetrator with at least one ordnance armed (e.g., an explosive, a stun grenade, a tazer, a tranquilizing dart, live ammunition such as bullets or rubber bullets, etc.) UAV.

The attack can further comprise at least one authorized person authorizing the physical assault on the potential unauthorized perpetrator (e.g., authorized person intervention or authorized person attack permission.)

The UAV can be equipped with, for example, a video camera and a communication link to the authorized image database to selectively execute the physical assault (e.g., UAV control, guidance, and ordnance deployment.).

The area can include, for example, a school, a classroom, a sport facility, an assembly hall, and like areas, where each authorized person can include, for example, a student, a faculty, an administrator, a staff, a facilities operation person (e.g., custodial, cafeteria worker, etc.), a security guard, a law enforcement officer, a peacekeeper, an invitee, a guest, having at least one image in the authorized image database.

The security system can detect and distinguish a perpetrator within the authorized persons, i.e., an authorized person who has gone rogue, who is carrying a weapon, or who is behaving out-of-sorts.

The security system provides a system for detecting a perpetrator comprising a video surveillance camera (e.g., a network of live video surveillance cameras) in an area that collects live video images of each person present in the area; an authorized image database; a first video analyzer that analyzes (i.e., compares) the collected live video images of each person present in the area and the authorized image database; if each person present in the area has an image in the authorized image database then only authorized persons are present; if each person present in the area does not have an image in the authorized image database then a potential unauthorized person or an unauthorized perpetrator is detected (i.e., present); and a UAV having a video camera and ordnance delivery, the UAV is in communication with the video analyzer for guidance to and interception of the detected and unauthorized perpetrator in the area.

The security systems are advantaged is several aspects, including for example: the security system can operate, for example, autonomously, semi-autonomously, dependently, or a combination thereof; the security system can operate, for example, in isolation or in collaboration with a plurality of other like security systems within a contained environment such as a high school or a prison, or as part of a network of separated environments such as school district, a statewide university system, or a statewide or federal prison system; the security system can provide, for example, a primary or a supplemental autonomous or semi-autonomous security force with or without involvement or control by security personnel; the security system can empower responsible individuals (e.g., teachers, staff, school monitors, and like persons) to quickly initiate lifesaving security measures, for example, with a laser lock-on by aiming a laser pointer (and not a firearm) at an active shooter to activate an appropriate security system response; the security system can be readily trained or retrained to accommodate changes in, for example, behavior, custom, language, operating procedures, law, criminal tactics, and like dynamics; the security system can be highly effective in providing continuous (24/7/365) security surveillance and security responses; and the security system can be highly effective at neutralizing physical threats with, for example, high detection reliability and high ordnance delivery accuracy.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. A security system comprising:
    a stationary base station located within a predefined protected area;
    said stationary base station including
        a detector, said detector being located within said stationary base station, said detector being configured to automatically sense the predefined protected area and automatically detect a physical threat within the predefined protected area, the physical threat being from a first person intending to do harm to a predetermined set of persons located within the predefined protected area, and
        a weaponized UAV, said weaponized UAV being located within said stationary base station, said weaponized UAV being configured to operatively communicate with said detector;
    said detector, to use in detecting the physical threat within the predefined protected area, collecting archival images of each person authorized to be in the predefined protected area to form an archival image database of authorized persons, collecting contemporaneous images of each person in the predefined protected area with an imager, comparing the collected contemporaneous images of each person with the archival images of each person in the archival image database of authorized persons to determine if a person is an authorized person, collecting archival images of authorized weapons in the predefined protected area to form an archival authorized weapons database of authorized weapons, collecting contemporaneous images of weapons in the predefined protected area with an imager, and comparing the collected contemporaneous images of weapons with the archival images of authorized weapons in the archival image database to determine if a contemporaneous image of a weapon is an authorized weapon;
    said weaponized UAV being configured to be automatically deployed within the predefined protected area in response to said detector communicating the detection of said physical threat within the predefined protected area;
    said weaponized UAV being configured to neutralize the physical threat within the predefined protected area when deployed to the predefined protected area.

2. The system of claim 1 further comprising at least one of: a weaponized UAV computer, a base station computer, a facilities computer, a cloud computer, a plurality of weaponized UAVs having physical separation, or a combination thereof.

3. A method for detecting and neutralizing an active shooter, comprising:
    (a) automatically sensing, using a detector located within a predefined protected area, the predefined protected area, the detector being housed in a stationary base station located within the predefined protected area;
    (b) automatically, based upon said automatic sensing of the predefined protected area, detecting a physical threat, the physical threat being from a first person intending to do harm to an innocent population in the predefined protected area;
    said (b) automatically detecting the physical threat, to use in automatically detecting the physical threat within the predefined protected area, collects archival images of each person authorized to be in the predefined protected area to form an archival image database of authorized persons, collects contemporaneous images of each person in the predefined protected area with an imager, compares the collected contemporaneous images of each person with the archival images of each person in the archival image database of authorized persons to determine if a person is an authorized person, collects archival images of authorized weapons in the predefined protected area to form an archival authorized weapons database of authorized weapons, collects contemporaneous images of weapons in the predefined protected area with an imager, and compares the collected contemporaneous images of weapons with the archival images of authorized weapons in the archival image database to determine if a contemporaneous image of a weapon is an authorized weapon; and
    (c) deploying automatically, in response to the detection of the physical threat to the innocent population in the predefined protected area, a weaponized UAV, the weaponized UAV being housed in the stationary base station, the weaponized UAV being deployed within the predefined protected area to neutralize the detected physical threat.

4. The method of claim 3 wherein said automatically detecting is selected from anomaly detection, object detection, behavioral detection, pattern-of-life detection, or a combination thereof.

5. The method of claim 3 wherein said automatically detecting the physical threat within a predefined protected area, from the first person intending to do harm to the innocent population in the predefined protected area is accomplished using facial recognition software processing of all persons in the predefined protected area, sensed by the detector, to differentiate the physical threat within a predefined protected area, from the innocent population.

6. The method of claim 3 wherein the detected physical threat is selected from an adversarial person, an adversarial weapon, an adversarial object, an adversarial behavior, an anomalous behavior, or a combination thereof.

7. The system of claim 1 wherein said detector continuously assesses physical threats within a predefined protected area, posed by any potential target;

the system further comprising a computer configured to compute an optimized defense trajectory to continuously train said weaponized UAV and to continuously refine defensive capability of said weaponized UAV.

8. The system of claim 1, further comprising:

a laser pointer, located within the predefined protected area, operatively communicating with said detector;

said laser pointer, in response to the detection of said physical threat; within a predefined protected area generating a laser beam to aim at the detected physical threat;

said weaponized UAV, in response to the laser beam, locking onto and neutralizing the detected physical threat.

9. The method of claim 3 wherein said (c) automatic deploying of the weaponized UAV being in response to a determination that an unauthorized person is within the predefined protected area.

10. The method of claim 9 wherein said (c) automatic deploying of the weaponized UAV being in response to a determination that an unauthorized weapon is within the predefined protected area.

\* \* \* \* \*